United States Patent [19]

Oishi et al.

[11] 4,354,220
[45] Oct. 12, 1982

[54] GAS INSULATED POWER SWITCH-GEAR APPARATUS

[75] Inventors: Kazuaki Oishi, Hitachi; Seizo Nakano, Mito, both of Japan

[73] Assignee: Hatachi, Ltd., Tokyo, Japan

[21] Appl. No.: 168,779

[22] Filed: Jul. 11, 1980

[30] Foreign Application Priority Data

Jul. 20, 1979 [JP] Japan .................................. 54-91525

[51] Int. Cl.³ ............................................. H02B 1/20
[52] U.S. Cl. .................................. 361/341; 307/147; 361/333; 200/301
[58] Field of Search ............ 200/50 AA, 50 C, 48 R, 200/148 R, 148 B, 148 G, 148 D, 301; 361/333, 335, 341, 378; 174/71 B, 72 B, 99 B; 307/113, 147

[56] References Cited

U.S. PATENT DOCUMENTS 3,891,862 6/1975 Clark ................................. 361/335
4,032,820 6/1977 Oishi .................................. 361/333

Primary Examiner—Gerald P. Tolin
Attorney, Agent, or Firm—Antonelli, Terry & Wands

[57] ABSTRACT

A gas insulated power switch gear apparatus of a reduced height comprising gas insulated circuit breakers arranged horizontally and disconnecting switches operated vertically is disclosed. Each of the disconnecting switches includes a first sheath portion inserted into an interrupted point of a main bus bar and mechanically connected with the sheath of the main bus bar through an insulating spacer for defining a gas section, and a second sheath portion communicating with the first sheath portion and crossing and extending in the direction perpendicular to the first sheath portion. A collector electrically connected with the conductor of a feeding bus bar is arranged within the second sheath portion, and a movable contactor normally electrically connected with the collector is movable vertically. A fixed contactor electrically connected with the main bus bar conductor and engageable with the movable contactor is arranged within the first sheath portion.

7 Claims, 8 Drawing Figures

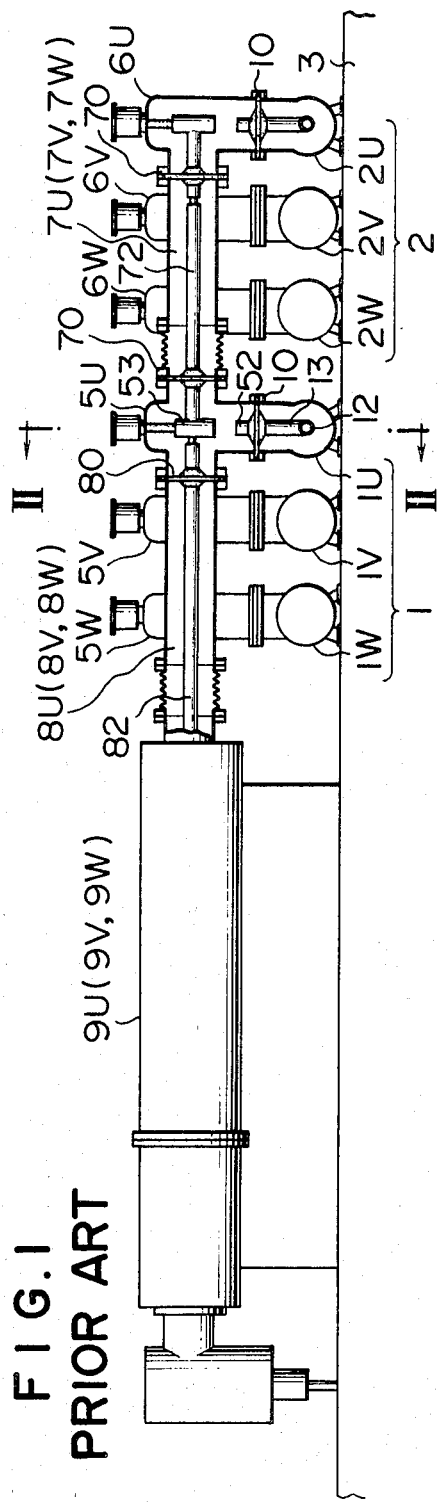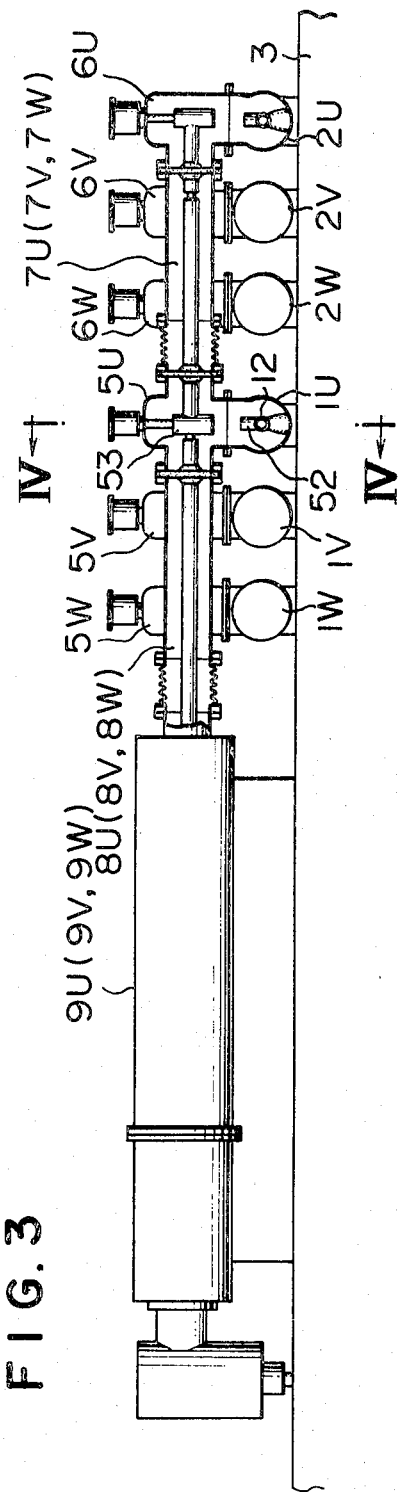
FIG. 1 PRIOR ART
FIG. 3

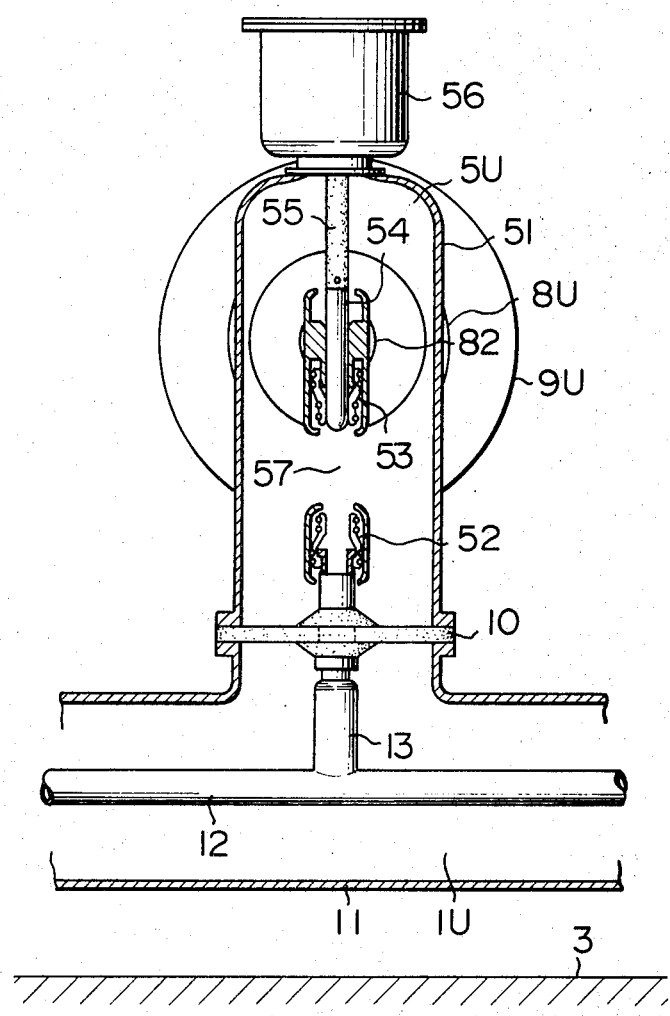

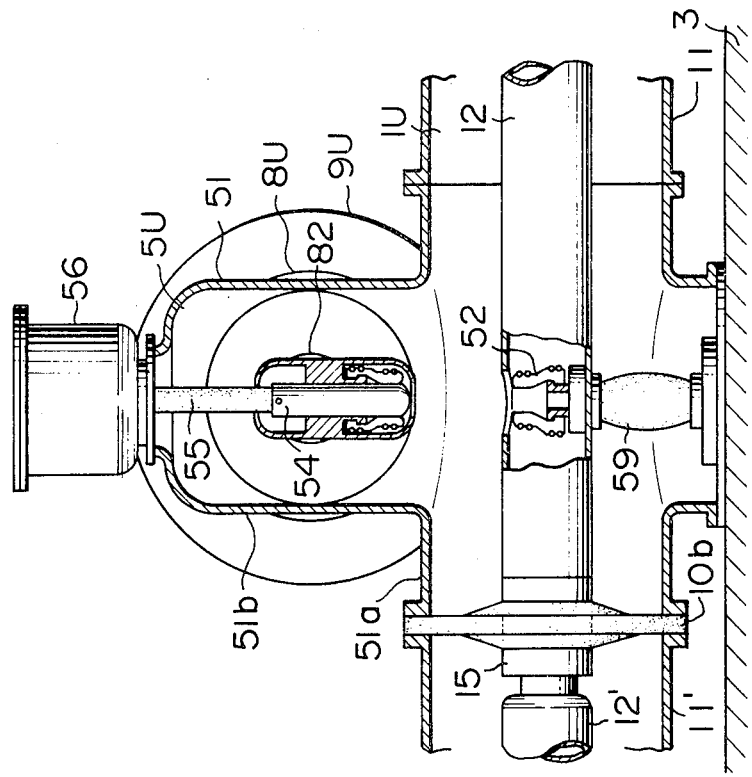
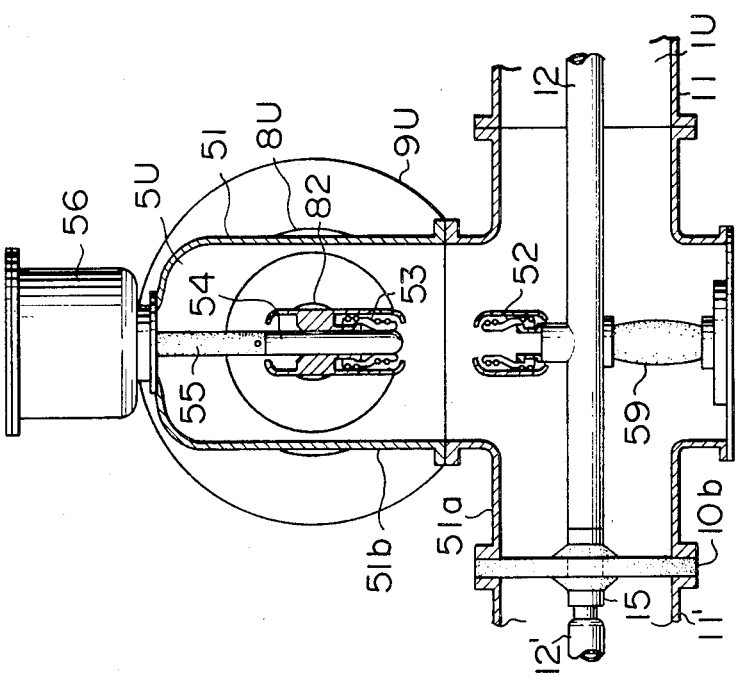

GAS INSULATED POWER SWITCH-GEAR APPARATUS

The present invention relates to a gas insulated power switch-gear apparatus, or more in particular to a gas insulated power switch-gear apparatus comprising horizontally arranged gas insulated circuit breakers and gas insulated disconnecting switches effecting the switching operation in a vertical direction.

The prior art and the present invention and the advantages of the latter will be described in detail with reference to the accompanying drawings, in which:

FIG. 1 shows a partially sectional elevation of a prior art gas insulated power switch-gear apparatus;

FIG. 2 is a sectional view taken in line II—II in FIG. 1 for showing the construction of a gas insulated disconnecting switch used in the gas insulated power switch-gear apparatus of FIG. 1;

FIG. 3 shows a partially sectional elevation of a gas insulated power switch-gear apparatus according to an embodiment of the present invention;

FIG. 7 is a diagram showing a modification of the gas insulated disconnecting switch of FIG. 4; and FIG. 8 is a diagram showing a modification of the gas insulated disconnecting switch of FIG. 6.

Figure 4:
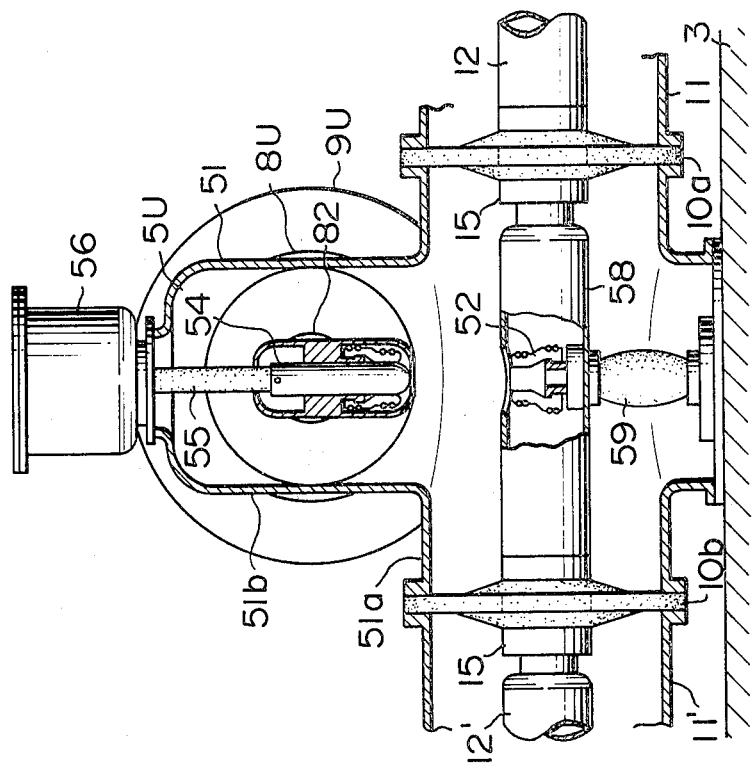
FIG. 4 is a sectional view taken in line IV—IV in FIG. 3 for showing the construction of a gas insulated disconnecting switch used in the gas insulated power switch-gear apparatus of FIG. 3.

Generally, in order to reduce the size of a power electric substation or power electric switching station, a gas insulated power switch-gear apparatus is used wherein the electrical parts of the switch-gear apparatus are sealed with an insulating gas such as $SF_6$ gas.

The installation height of the gas insulated power switch-gear apparatus is required to be reduced for facilitating maintenance and inspection and for improving the earthquake resistance to minimize the damage of the apparatus by the earthquake. In compliance with this requirement, the gas insulated power switch-gear apparatus is commonly arranged horizontally.

In order to reduce the installation area, on the other hand, the gas insulated power switch-gear apparatus is installed in a double plane arrangement. In this double plane arrangement, disconnecting switches and feeding bus bars are arranged in juxtaposition with main bus bars in the direction perpendicular to the plane of installation of the switch-gear apparatus, with the inevitable result that the installation height of the switch-gear apparatus is increased, thus posing the problem of a reduced earthquake resistance.

A conventional gas insulated power switch-gear apparatus of double bus bar 1CB type installed in a double plane arrangement is shown in FIG. 1. Gas insulated circuit breakers are arranged horizontally. A first main bus bar apparatus 1 has main bus bars 1U, 1V and 1W corresponding to the respective phases of the three-phase power, and a second main bus bar apparatus 2 similarly has main bus bars 2U, 2V and 2W. These main bus bars are arranged in parallel on the ground or an installation foundation 3. Gas insulated disconnecting switches 5U, 5V and 5W are arranged above the main bus bars 1U, 1V and 1W respectively, while gas insulated disconnecting switches 6U, 6V and 6W are arranged above the main bus bars 2U, 2V and 2W respectively. The disconnecting switch 6U is electrically connected to the disconnecting switch 5U through a feeding bus bar 7U, while the disconnecting switch 5U is electrically connected to the circuit breaker 9U through a feeding bus bar 8U. In similar fashion, the disconnecting switches 6V and 6W are connected electrically to the disconnecting switches 5V and 5W through feeding bus bars 7V and 7W respectively, while the disconnecting switches 5V and 5W are connected electrically to the circuit breakers 9V and 9W respectively through feeding bus bars 8V and 8W. In FIG. 1, the main bus bars 1U, 2U, the disconnecting switches 5U, 6U and the feeding bus bars 7U, 8U are shown in sectional view.

In the double plane arrangement of the switch-gear apparatus shown in FIG. 1, the disconnecting switch is used which has an axis substantially perpendicular to the foundation 3 and operates vertically or in the direction perpendicular to the foundation 3. This disconnecting switch may be replaced by a disconnecting switch having an axis substantially parallel to the foundation 3 and operating horizontally or in the direction perpendicular to the foundation 3. In the case where such a horizontally operating disconnecting switch is used, however, the installation area is increased as compared with the case where the vertically operating disconnecting switch is employed, so that the installation area reducing effect is degraded.

It will be seen from FIG. 1 that, in the case where the switch-gear apparatus is installed in a double plane arrangement, the feeding bus bars 7U to 7W and 8U to 8W and the circuit breakers 9U to 9W are arranged to have an axis in a plane at a level higher than the level of the main bus bars 1U to 1W and 2U to 2W, with the result that the feeding bus bars 7U to 7W and 8U to 8W and the circuit breakers 9U to 9W are required to be supported at a higher position thus reducing the earthquake resistance thereof. The height of the plane containing the axes of the feeding bus bars 7U to 7W and 8U to 8W and the circuit breakers 9U to 9W is determined by the axial length of the disconnecting switches 5U to 5W and 6U to 6W operating in the vertical direction.

The construction of the disconnecting switch 5U is shown in FIG. 2. The other disconnecting switches have substantially the same construction. The disconnecting switch 5U has a cylindrical sheath 51 having an axis extending in the direction perpendicular to the foundation 3, which sheath 51 is connected through an insulating spacer 10 to a sheath 11 of the main bus bar 1U. The insulating spacer 10 is a stop spacer for defining the gas section of the main bus bar 1U and the gas section of the disconnecting switch 5U, and prevents an accident which might occur in the disconnecting switch 5U from affecting the other disconnecting switches or the feeding bus bars connected to the disconnecting switches through the main bus bar 1U. The sheath 51 is also connected through insulating spacers 70 and 80 (FIG. 1) to sheathes 71 and 81 of the feeding bus bars 7U and 8U respectively. The insulating spacers 70 and 80 define the gas section of the feeding bus bars 7U and 8U and the gas section of the disconnecting switch 5U. A fixed contactor 52 secured to the insulating spacer 10 is provided on the axis of the disconnecting switch 5U, which fixed contactor 52 is connected electrically to a conductor 12 of the main bus bar 11 through a connecting conductor 13 connected to the conductor 12. A collector 53 is also arranged on the axis of the disconnecting switch 5U. This collector 53 is fixedly supported on the insulator spacers 70 and 80 and electrically connected to the conductors 72 and 82 (FIG. 1) of the feeding bus bars 7U and 8U. A movable contactor 54 is adapted to slide in the collector 53 while being kept in contact with the collector 53, by the operation of an actuator 56 through an insulating rod 55. In such a construction of the disconnecting switch, the connecting conductor 13, the insulating spacer 10, the fixed contactor 52 and the operating gap 57 of the disconnecting switch 5U are required to be provided above the conductor 12 of the main bus bar 1U and also there is required to provide a space for taking off the main bus bar 1U from the disconnecting switch 5U and placing it down on the foundation 3 for the purpose of inspection. Accordingly, the collector 53 is positioned at a high level, so that the feeding bus bars 7U and 8U and the circuit breaker 9U are also required to be arranged at the high level. For instance, in a switch-gear apparatus of 500 kV, the height from the foundation 3 to the axis of the main bus bar 1U, i.e., the conductor 12 is about 1 m, the height to the axis of the feeding bus bars 7U and 8U and the circuit breaker 9U is about 3 m, and the height to the top of the disconnecting switch 5U or the circuit breaker 9U is about 4.5 m. Since the feeding bus bars and the circuit breaker are supported at such a high level, the earthquake resistance of the switch-gear apparatus is deteriorated.

The object of the present invention is to provide a gas insulated switch-gear apparatus which is not so high and has an improved resistance to earthquakes.

According to the present invention, there is provided a gas insulated switch-gear apparatus wherein the sheath of the disconnecting switch includes a first sheath portion inserted at an interrupted point of the main bus bar, having substantially the same outer diameter as the sheath of the main bus bar and having its axis aligned with the axis of the main bus bar, and a second sheath portion communicating with the first sheath portion and having an axis extending in the direction perpendicular to the foundation; and the fixed contactor is disposed within the first sheath portion. In this construction, the insulating spacer 10 shown in FIG. 2 is eliminated and replaced by an insulating spacer which is arranged at the junction between the first sheath portion and the sheath of the main bus bar.

The above-mentioned construction of the sheath of the disconnecting switch and the arrangement of the insulating spacer are disclosed for example in Japanese patent application laid-open No. 29539/78. This Japanese patent application, however, aims at removing minute conductive particles which might be deposited on the insulating spacer arranged horizontally as shown in FIG. 2 but not to reduce the height of the gas insulated switch-gear apparatus unlike the present invention. Thus, the above-cited Japanese patent application neither discloses nor suggests an arrangement of the fixed contactor 52 shown in FIG. 2 within the first sheath portion of the disconnecting switch.

Preferred embodiments of the present invention will be described in detail below with reference to FIGS. 3 to 8. The gas insulated switch-gear apparatus according to an embodiment of the present invention is shown in FIG. 3 similar to FIG. 1. The disconnecting switches 5U to 5W and 6U to 6W used in this switch-gear apparatus do not include the insulating spacer 10 and the connecting conductor 13 arranged in series with the fixed contactor 52 and the collector 53 in the direction perpendicular to the foundation 3. This makes it possible to reduce the height of the switch-gear apparatus. The construction of the disconnecting switch will be described in detail with reference to FIG. 4.

A sectional view of the disconnecting switch 5U is shown in FIG. 4 which is similar to FIG. 2. Those component elements in FIG. 4 which are the same as those in FIG. 2 are denoted by the same reference numerals as in FIG. 2. The other disconnecting switches have substantially the same construction as the disconnecting switch 5U. The sheath 51 of the disconnecting switch 5U includes a first sheath portion 51a extending in parallel to the foundation 3 and having an axis aligned with the axis of the main bus bar 1U, and a second sheath portion 51b having an axis extending in the direction perpendicular to the foundation 3. The first sheath portion 51a has substantially the same outer diameter as the sheath 11 of the main bus bar 1U. This sheath portion 51a is inserted in the interrupted point of the main bus bar 1U and connected to the interrupted halves 11 and 11' of the sheath of the main bus bar 1U via the insulating spacers 10a and 10b respectively. The insulating spacers 10a and 10b are similar to the insulating spacer 10 shown in FIG. 2 and define the gas section of the main bus bar 1U and the gas section of the disconnecting switch 5U. The conductor 58 arranged on the axis of the first sheath portion 51a is fixed on the insulating spacers 10a and 10b and supported on an insulating support pole 59 as required. The conductor 58 is connected electrically to the interrupted main bus bar conductor halves 12 and 12' by the connectors 15 having a conductor passing through the insulating spacers 10a and 10b. Thus, the conductor 58 makes a part of the main bus bar conductor, and the first sheath portion 51a makes a part of the main bus bar sheath. The first sheath portion 51a is connected mechanically directly with the second sheath portion 51b, and the insulating spacer 10 shown in FIG. 2 is eliminated by the provision of the insulating spacers 10a and 10b. Since the insulating spacer 10 is omitted, the first sheath portion 51a and the second sheath portion 51b may be formed integrally instead of individually provided and mechanically coupled with each other as shown. In the case where the first and second sheath portions are individually provided, an internal inspection of the disconnecting switch 5U can be facilitated. As in the previous case, the fixed contactor 52, the collector 53 and the movable contactor 54 are arranged on the axis of the second sheath portion 51b. However, the fixed contactor 52 is directly secured to the conductor 58 without any intermediate member such as the insulating spacer 10 and the connecting conductor 13 shown in FIG. 2, and thus is positioned substantially inside of the first sheath portion 51a. As a result, the position of the collector 53, and hence the positions of the feeding bus bars 7U and 8U and the circuit breaker 9U can be lowered at least by the height of the eliminated insulating spacer 10 and the connecting conductor 13. Further, the main bus bar 1U is connected to the first sheath portion 51a of the disconnecting switch 5U and is separable from the disconnecting switch 5U horizontally, i.e., in the direction parallel to the foundation 3, so that it is not necessary to provide a space for removing the main bus bar 1U in the direction perpendicular to the foundation 3, thereby further making it possible to lower the positions of the feeding bus bars 7U and 8U and the circuit breaker 9U. According to this embodiment, the height of the axis of the feeding bus bars 7U to 7W and 8U to 8W and the circuit breakers 9U to 9W from the foundation 3 is reduced to about 2 m to 2.2 m, which is about 1 m lower than in the case of the conventional gas insulated switch-gear apparatus shown in FIG. 1.

Figure 5:
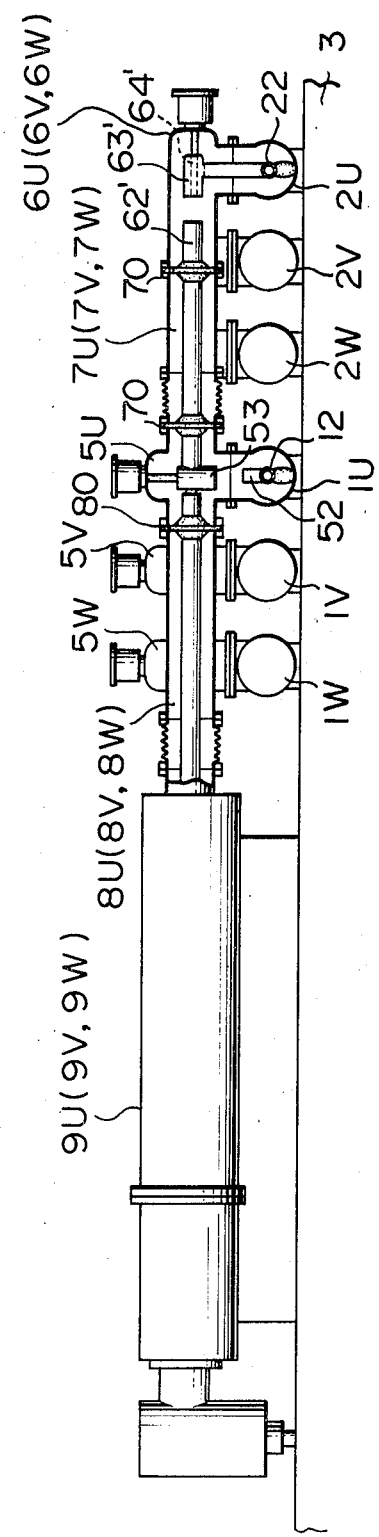
FIG. 5 is a partially sectional elevation of a gas insulated power switch-gear apparatus according to another embodiment of the present invention.

In the embodiment of FIG. 3, a disconnecting switch operating in the direction perpendicular to the foundation is used for all the main bus bars 1U, 1V, 1W, 2U, 2V and 2W. The main bus bars 2U, 2V and 2W are arranged in parallel to the main bus bars 1U, 1V and 1W, so that a horizontal space is provided between the main bus bars 1U and 2U, between 1V and 2V and between 1W and 2W. Therefore, with respect to the main bus bars 2U, 2V and 2W, it is possible to use conventional disconnecting switches operating horizontally or in parallel with the foundation, without further increasing the installation space. In other words, in a double bus bar construction such as shown in FIG. 1, the object of the present invention may be attained also when the disconnecting switches 5U to 5W as shown in FIG. 4 are used for the main bus bar apparatus 1 arranged nearer to the circuit breakers 9U to 9W while conventional disconnecting switches 6U to 6W operating in the horizontal direction are used for the main bus bar apparatus 2 arranged farther from the circuit breakers 9U to 9W. A gas insulated switch-gear apparatus according to an embodiment of the present invention having such a construction is shown in FIG. 5. The disconnecting switches 6U, 6V and 6W used in this embodiment are well known and therefore will not be described in detail, but the disconnecting switch 6U has an axis aligned with the feeding bus bar 7U, on which axis are arranged a fixed contactor 62' electrically connected with the conductor 72 of the feeding bus bar 7U, a collector 63' electrically connected with the conductor 22 of the main bus bar 2U, and a movable contactor 64' normally connected electrically with the collector 63' for effecting electrical connection or disconnection with the fixed contactor 62', thus accomplishing the switching operation along the axis of the feeding bus bar 7U, namely, in the horizontal direction.

Figure 6:
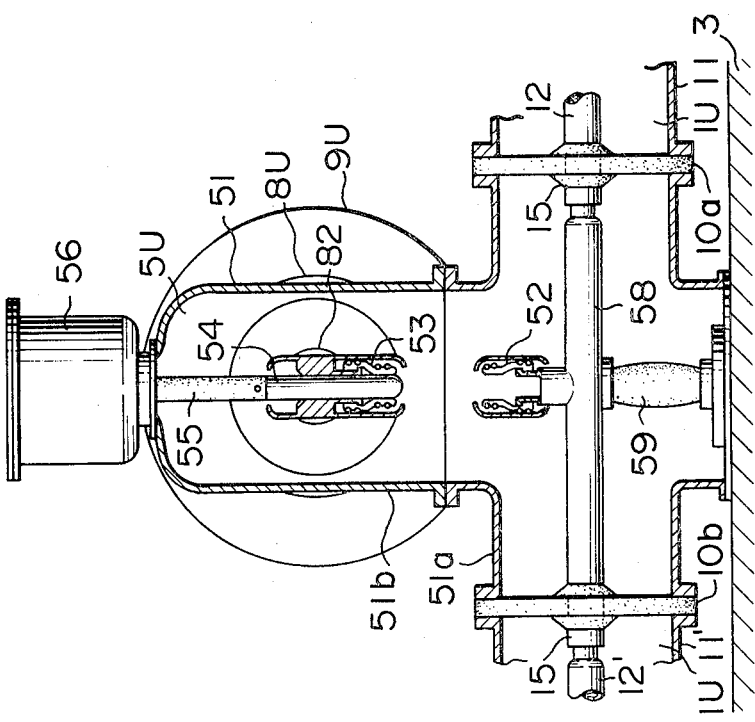
FIG. 6 is a diagram similar to FIG. 4 for showing the construction of a gas insulated disconnecting switch used in the embodiment of FIG. 5.

The construction of a disconnecting switch used in a gas insulated switch-gear apparatus according to another embodiment of the present invention is shown in FIG. 6 which is similar to FIG. 4. In a main bus bar apparatus of large current capacity, the conductor of each bus bar has a large diameter. The conductor 12 of the main bus bar, accompanied with a switch-gear apparatus of 500 KV class, for instance, has a diameter of about 0.3 m, and that of the main bus bar, using a switch-gear apparatus of 1000 KV class has a diameter of about 0.5 m. Such main bus bars usually employ a hollow conductor. For the main bus bar 1U having the conductor 12 of such a large diameter, a hollow conductor of substantially the same diameter as the conductor 12 is employed as the conductor 58. In this case, a hole having an axis aligned with the axis of the second sheath portion 51b is formed in the conductor 58, thus making it possible to arrange the fixed contactor 52 within the conductor 58. It will be easily understood that the use of the disconnecting switch shown in FIG. 6 further reduces the height of the switch-gear apparatus.

A modification of the disconnecting switch 5U of FIG. 4 is shown in FIG. 7. In the disconnecting switch of FIG. 7, the insulating spacer 10a is not provided but the first sheath portion 51a is directly connected to the main bus bar sheath 11. In the case where a plurality of feeding bus bars are connected with the main bus bar 1U, a plurality of disconnecting switches 5U are provided on the main bus bar 1U and each of the disconnecting switches 5U is provided with the insulating spacer 10b, so that any accident which may occur in any one of the plurality of the disconnecting switches may be prevented by the insulating spacer 10b from spreading. In this case, the conductor 58 shown in FIG. 4 is not necessary and the fixed contactor 52 is directly connected to the conductor 12 of the main bus bar. The insulating spacer 10a may also be omitted in the same manner, for the disconnecting switch of FIG. 6. A disconnecting switch of FIG. 6 modified in such a manner is shown in FIG. 8.

The foregoing description of the embodiments concerns a double bus bar construction, but it will be easily understood that the same description also applies to a single bus bar construction. Although the foregoing description is such that the axes of the feeding bus bars 7U to 7W and 8U to 8W are coincident with those of the circuit breakers 9U to 9W respectively, the circuit breakers 9U to 9W may be arranged at a level lower than the level of the feeding bus bars 7U to 7W and 8U to 8W.

When an accident occurs at the insulating spacer 10a or 10b, it is necessary to suspend the power supply by the feeding bus bar as if an accident occurred in the disconnecting switch and at the same time to suspend the power supply by the main bus bars as if an accident occurred in the main bus bars. Therefore, the main bus bars may be interrupted and the disconnecting switch may be inserted at the interrupted point without any adverse effect.

According to the present invention, instead of constructing the main bus bar 1 or 2 with the three main bus bars 1U, 1V and 1W or 2U, 2V and 2W shown in FIG. 3 or 5, each main bus bar apparatus 1 or 2 may be constructed by containing three conductors representing three phases in a single sheath. In the latter case, however, the three conductors are arranged at the apexes of a triangle within the sheath when viewed in the cross-section, and therefore at least two of the three conductors require conductor members (which will be curved) corresponding to the connecting conductor 13 of FIG. 2. Accordingly, the height of the gas insulated switch gear apparatus cannot be reduced satisfactorily.

We claim:
1. A gas insulated power switch-gear apparatus comprising:
   three main bus bars having axes extending in a predetermined first direction in a first horizontal plane, each of said main bus bars including a sheath filled with an insulating gas and a main conductor arranged within said sheath;
   three feeding bus bars having axes extending in a second direction perpendicular to said first direction in a second horizontal plane of a level different from said first horizontal plane, each of said feeding bus bars including a sheath filled with an insulating gas and a feeder conductor arranged within said sheath;
   a plurality of gas insulated circuit breakers having axes extending in said second direction and electrically connected with said feeding bus bars respectively; and a plurality of gas insulated disconnecting switches each arranged between a corresponding one of said feeding bus bars and a corresponding one of said main bus bars, each of said gas insulated disconnecting switches being inserted into an interrupted point of said main bus bar and having an axis aligned with the axis of said main bus bar and a diameter substantially the same as that of the sheath of the main bus bar, each of said gas insulated disconnecting switches further including a sheath having a first sheath portion with the ends thereof connected mechanically with interrupted halves of the sheath of the main bus bar and a second sheath portion communicating with said first sheath portion and having an axis extending in a third direction perpendicular to said first and second horizontal planes, at least one insulating spacer inserted between said first sheath portion and the main bus bar sheath, at least one of the ends of said first sheath portion for defining a gas section, a fixed contactor having an axis coincident with the axis of said second sheath portion and electrically connected with a main conductor, said fixed contactor being arranged within said first sheath portion, a collector having an axis coincident with the axis of said second sheath portion and electrically connected with said feeder conductor, said collector being secured within said second sheath portion, and a movable contactor having an axis coincident with the axis of said collector and normally electrically connected with said collector, said movable contactor being movable in said third direction for effecting electrical connection or disconnection with said fixed contactor.

2. A gas insulated power switch-gear apparatus according to claim 1, in which said insulating spacer is provided at each of the ends of said first sheath portion, and said fixed contactor is provided on a conductor aligned with said main conductor and electrically connecting interrupted halves of the main conductor to each other.

3. A gas insulated power switch-gear apparatus according to claim 1, in which said insulating spacer is provided at each of the ends of said first sheath portion, and said fixed contactor is provided within a conductor aligned with said main conductors and electrically connecting interrupted halves of the main conductor to each other.

4. A gas insulated power switch-gear apparatus according to claim 1, in which said insulating spacer is provided at one end of said first sheath portion, and said fixed contactor is provided on said main conductor.

5. A gas insulated power switch-gear apparatus according to claim 1, in which said insulating spacer is provided at one end of said first sheath portion, and said fixed contactor is provided within said main conductor.

6. A gas insulated power switch-gear apparatus according to claim 1, 2, 3, 4 or 5, further comprising:
three other main bus bars having axes extending in said first direction in said first horizontal plane and having substantially the same construction as said main bus bars;
three other feeding bus bars having axes extending in said second direction in said second horizontal plane and having substantially the same construction as said feeding bus bars, said other feeding bus bars being electrically connected to said gas insulated circuit breakers through said disconnecting switches and said feeding bus bars, respectively; and
other gas insulated disconnecting switches each arranged between a corresponding one of said other feeding bus bars and a corresponding one of said other main bus bars and having substantially the same construction as said gas insulated disconnecting switches.

7. A gas insulated power switch-gear apparatus according to claim 1, 2, 3, 4 or 5, further comprising:
three other main bus bars having axes extending in said first direction in said first horizontal plane and having substantially the same construction as said main bus bars;
three other feeding bus bars having axes extending in said second direction in said second horizontal plane and having substantially the same construction as said feeding bus bars, said other feeding bus bars being electrically connected to said gas insulated circuit breakers through said disconnecting switches and said feeding bus bars respectively; and
a plurality of other gas insulated disconnecting switches each arranged between a corresponding one of said other feeding bus bars and a corresponding one of said other main bus bars, each of said other gas insulated disconnecting switches including a fixed contactor having an axis coincident with the axis of the corresponding feeding bus bar and electrically connected with the feeder conductor of said corresponding feeding bus bar, a collector having an axis coincident with the axis of the corresponding feeding bus bar and electrically connected with the main conductor of the corresponding main bus bar, and a movable contactor having an axis coincident with the axis of said collector and normally electrically connected with said collector, said movable contactor being movable along the axis of the corresponding feeding bus bar for effecting electrical connection or disconnection with said fixed contactor.

* * * * *